(12) United States Patent
Rossi et al.

(10) Patent No.: US 10,658,129 B2
(45) Date of Patent: May 19, 2020

(54) DEVICE FOR CONTROLLING THE CONTACTS OF AN ELECTRICAL SWITCH

(71) Applicant: Schneider Electric Industries SAS, Rueil Malmaison (FR)

(72) Inventors: Nicolas Rossi, Sassenage (FR); Dominique Treffot, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 159 days.

(21) Appl. No.: 15/886,051

(22) Filed: Feb. 1, 2018

(65) Prior Publication Data

US 2018/0247775 A1   Aug. 30, 2018

(30) Foreign Application Priority Data

Feb. 24, 2017   (FR) ...................................... 17 51478

(51) Int. Cl.
| | |
|---|---|
| *H01H 3/26* | (2006.01) |
| *H02B 3/00* | (2006.01) |
| *G06K 7/14* | (2006.01) |
| *H01H 33/42* | (2006.01) |
| *H02B 1/34* | (2006.01) |

(52) U.S. Cl.
CPC ............. *H01H 3/26* (2013.01); *G06K 7/1417* (2013.01); *H01H 33/42* (2013.01); *H02B 3/00* (2013.01); *H01H 2003/266* (2013.01); *H01H 2205/002* (2013.01); *H01H 2221/01* (2013.01); *H01H 2221/068* (2013.01); *H01H 2225/006* (2013.01); *H02B 1/34* (2013.01)

(58) Field of Classification Search
CPC .... H01H 3/26; H01H 33/42; H01H 2003/266; H01H 2205/002; H01H 2221/01; H01H 2221/068; H01H 2225/006; G06K 7/1417; H02B 1/34; H02B 3/00
USPC ........................................................ 307/139
See application file for complete search history.

(56) References Cited

U.S. PATENT DOCUMENTS

| | | |
|---|---|---|
| 8,395,065 B2 | 3/2013 | Zylstra et al. |
| 2012/0055765 A1 | 3/2012 | Zylstra et al. |

FOREIGN PATENT DOCUMENTS

| | | |
|---|---|---|
| FR | 2 904 468 A1 | 2/2008 |
| WO | WO 2015/157631 A1 | 10/2015 |

OTHER PUBLICATIONS

French Preliminary Search Report dated Oct. 9, 2017 in French Application 17 51478, filed on Feb. 24, 2017 (with English Translation of Categories of cited documents & Written Opinion).

*Primary Examiner* — Hal Kaplan
(74) *Attorney, Agent, or Firm* — Oblon, McClelland, Maier & Neustadt, L.L.P.

(57) ABSTRACT

A portable control device designed to control contacts of an electrical switch, and including a main drive shaft, a holding shaft, a motor for driving the main shaft and a microcontroller for controlling the motor. In a first direction of insertion, the main shaft is able to be inserted into a first recess of the switch in order to perform a movement for opening/closing the contacts, the holding shaft then being housed in a first holding orifice. In a second direction of insertion, the main shaft is able to be inserted into a second recess of the switch in order to be able to perform a movement for grounding the contacts, the holding shaft then being housed in a second holding orifice. The control device also includes a detector of the direction of insertion, which detector is linked to the microcontroller.

13 Claims, 3 Drawing Sheets

DEVICE FOR CONTROLLING THE CONTACTS OF AN ELECTRICAL SWITCH

TECHNICAL FIELD OF THE INVENTION

The present invention relates to a portable control device that is designed to be mechanically connected to an electrical switch in order to actuate the mobile contacts thereof. In the present document, the term 'switch' equally covers several types of electrical unit, such as a switch, a disconnector, a fuse switch, a recloser or a circuit breaker. The invention is particularly suitable for medium-voltage and high-voltage electrical switches; that is to say that operate at a voltage of greater than 1000 V.

PRIOR ART

In a known manner, such an electrical switch has mobile contacts that make it possible to switch each phase of the electrical power supply grid. These mobile contacts may be situated at three separate positions: a first position, termed 'closed' position, in which they are in contact with corresponding fixed contacts of the switch, a second position, termed 'open' position, in which they are separated from these fixed contacts, and a third position, termed 'grounded' position, in which they are in contact with grounding conductors of the switch. One aim of the invention is to enable an operator to change the position of the mobile contacts in a simple and economical manner and in complete safety.

The switch usually has two axes of rotation, making it possible to actuate the mobile contacts from the front face of the switch, a first axis for the movement for opening/closing the contacts and a second axis for the movement for grounding the contacts. For safety reasons, these two axes are deliberately separate, such that two separate operations are necessary for example to move from the 'closed' position to the 'grounded' contacts position. Moreover, the two axes of rotation are usually interlocked, that is to say that only one of the two axes is accessible to an operator for performing an action at a given moment, the other being locked for example by blocking.

There are already various control means that enable an operator to manually control the operations of opening/closing the mobile contacts of a switch with respect to the fixed contacts and the operations of connecting/disconnecting the mobile contacts to/from ground. See in particular documents U.S. Pat. No. 8,395,065 or 8,456,259.

In some electrical switches, the control means are motorized and positioned permanently on the front face of the switches so as to be available at any time. Nevertheless, as these operations are performed relatively infrequently, keeping motorized control means on each switch at all times therefore proves costly, in particular for electrical switches of secondary circuits.

In many other cases, the control means are not motorized and the opening/closing and grounding operations are performed manually by an operator, for example using a handle that makes it possible to perform the two operations in two successive steps. However, in this case, it is necessary for the operator to be present in front of the switch at all times throughout the duration of the operations, thereby exhibiting potential risks. Specifically, the operation of opening the contacts for example may lead to the occurrence of internal electrical arcs that are potentially dangerous to individuals situated nearby.

There is therefore a need to propose a simple and economical solution that is capable of being adapted temporarily, in a simple and ergonomic manner, to existing non-motorized switches, and that is capable of performing the two operations (connection/disconnection and grounding) in complete safety for operators.

SUMMARY OF THE INVENTION

This aim is achieved by a portable control device designed to control contacts of an electrical switch, the control device comprising a main drive shaft, a holding shaft, a motor for driving the main shaft and a microcontroller for controlling the motor. The control device is designed such that, in a first direction of insertion, the main shaft is able to be inserted into a first manoeuvring recess of the switch in order to perform a movement for opening/closing the contacts of the switch, the holding shaft then being housed in a first holding orifice, and, in a second direction of insertion, the main shaft is able to be inserted into a second manoeuvring recess of the switch in order to be able to perform a movement for grounding the contacts of the switch, the holding shaft then being housed in a second holding orifice. The control device includes a detector of the direction of insertion of the control device into the switch, the detector of the direction of insertion being linked to the microcontroller.

According to one feature, the first holding orifice and the second holding orifice are combined into a single shared orifice. According to another feature, the first holding orifice corresponds to the second manoeuvring recess and the second holding orifice corresponds to the first manoeuvring recess.

According to one feature, the detector of the direction of insertion includes an inertial measurement unit. According to another feature, the control device comprises a position detector for verifying that the main shaft has been inserted into one of the first and second manoeuvring recesses of the switch. According to another feature, the control device includes an angular position sensor for determining the angular position of the main shaft. According to another feature, the control device includes a detector for detecting an overload of the electric current flowing through the motor. According to another feature, the control device includes a supply undervoltage detector, linked to the microcontroller, so as to prohibit movement of the motor if the supply voltage is below a predetermined threshold.

According to one feature, the main shaft and the holding shaft are not strictly parallel with one another. According to another feature, the control device includes an actuating finger that is offset with respect to the main axis and mechanically linked to the main axis. According to another feature, the control device includes a telescopic extension on which the holding shaft is mounted.

The invention also describes a system for controlling contacts of an electrical switch, comprising a control device and a portable external console linked to the control device through a wireless link, the external console including means for identifying the switch. According to one feature, the identification means include a QR code reader.

BRIEF DESCRIPTION OF THE DRAWINGS

Other features will appear in the following detailed description given with reference to the appended drawings, in which.

DETAILED DESCRIPTION OF THE DRAWINGS

Figure 1:
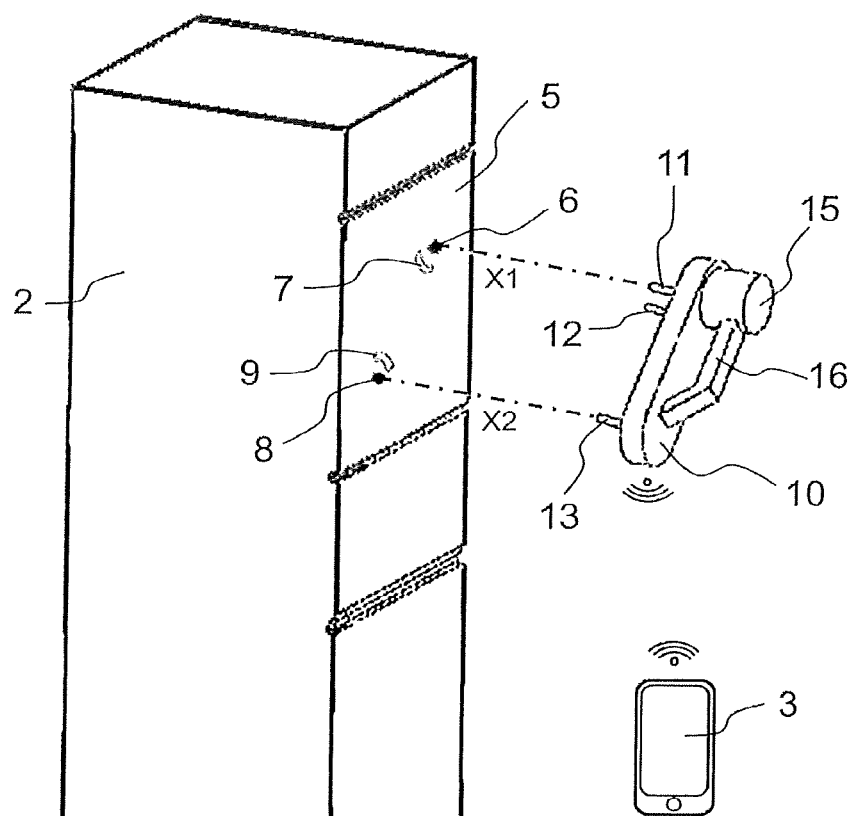
FIGS. 1 and 2 show an overview of a cell including a switch and of a control device according to the invention, the control device being positioned next to the switch in FIG. 1 and attached to the switch in FIG. 2.
Figure 2:
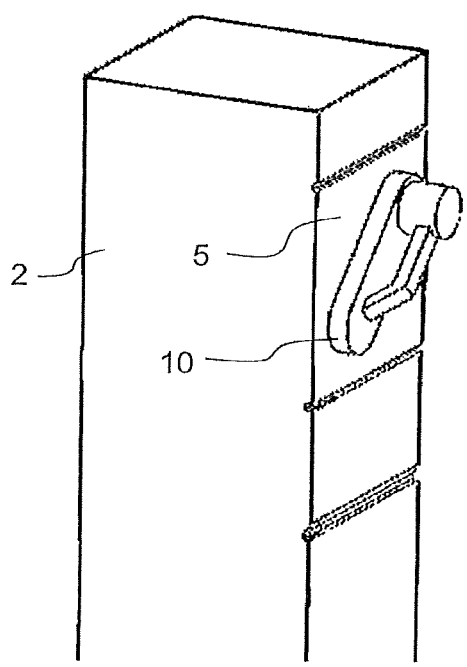

FIGS. 1 and 2 show, in a simplified manner, an item of electrical switchgear 2 including an electrical switch 5, and also a portable control device 10 that is positioned next to the front face of the switch 5 in FIG. 1, while in FIG. 2 this control device 10 is attached to the front face of the switch 5 in order to be able to actuate mobile contacts of the switch. FIGS. 1 and 2 show an item of electrical switchgear 2 comprising just one switch 5, but it is obvious that an item of electrical switchgear 2 may include several switches positioned next to one another.

The switch 5 includes a first manoeuvring recess 6 about a first axis X1 of rotation corresponding to the movement for opening/closing mobile contacts of the switch 5, and also includes a second manoeuvring recess 8 about a second axis X2 of rotation corresponding to the movement for grounding the mobile contacts of the switch 5.

The two manoeuvring recesses 6, 8 are parallel, positioned on the front face of the switch 5 and, for safety reasons, are deliberately separate from one another, such that two separate operations are necessary to move from the 'closed' position to the 'open' position, and then from the 'open' position to the 'grounded' position. The two manoeuvring recesses 6, 8 are able to receive an external unit, such as a handle or the control device 10 according to the invention, in order to perform a rotation of the first axis of rotation X1, respectively of the second axis X2, for the operations of opening/closing and of grounding the contacts, respectively. Moreover, for safety reasons, there may also be a blocking mechanism that is designed such that, depending on the position of the mobile contacts and the configuration of the switch 5, one of the two recesses 6, 8 remains blocked so as to prohibit a given type of manoeuvre.

The control device 10 includes a main drive shaft 11, a holding shaft 13, a motor 15 for actuating the main shaft 11 in rotation, and a microcontroller 20 that manages the operation of the control device 10 and that controls the motor 15. Advantageously, the same device 10 is used equally for both operations, thereby simplifying the solution. In terms of accessories, the control device 10 also has a handle 16 so as to be able to be handled easily by an operator. The control device is portable and detachable. It is thus positioned temporarily against a switch in order to perform control operations on this switch, and then it is removed so as to be able to perform these operations on another switch. An economical solution is thus obtained.

The dimensions of the main shaft 11 and of the holding shaft 13 of the control device 10 and their centre distance are designed such that, in a first direction of insertion, the main shaft 11 is able to be inserted into the first manoeuvring recess 6 of the switch 5 in order to perform a movement for opening/closing the contacts of the switch 5 along the axis of rotation X1, the holding shaft 13 then being housed in a first holding orifice. Reciprocally, in a second direction of insertion, the main shaft 11 is able to be inserted into the second manoeuvring recess 8 of the switch 5 in order to perform a movement for grounding the contacts of the switch 5 along the axis of rotation X2, the holding shaft 13 then being housed in a second holding orifice.

As the first holding orifice and the second holding orifice receive the auxiliary shaft 13 in one direction of insertion or the other, they enable angular blocking and attachment of the control device 10 in position against the switch 5. They may be situated on the front face of the switch 5, but could also, in an equivalent manner, be situated on the front face of another switch positioned next to the switch 5 in the cell 2.

Figure 4A:
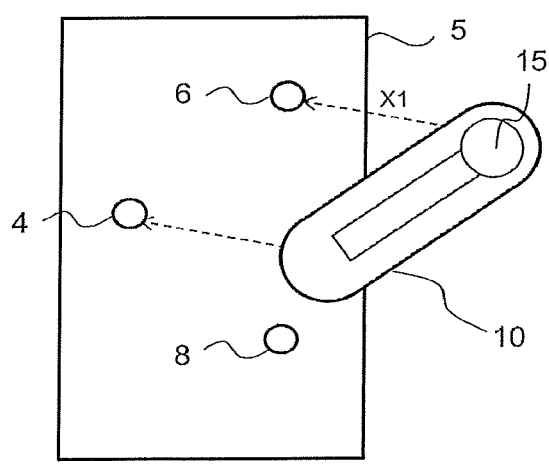
FIGS. 4a, 4b and 5 show various solutions for attaching a control device.
Figure 4B:
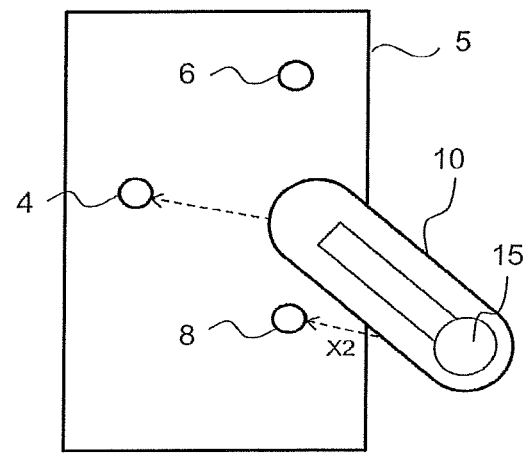

In the embodiment of FIGS. 4a and 4b, the first holding orifice and the second holding orifice are one single and identical shared orifice 4, situated for example on the front face of the switch 5 and at an equal distance from the recesses 6 and 8. When the control device 10 is inserted in one direction of insertion or the other (FIG. 4a or FIG. 4b, respectively), the auxiliary shaft 13 is thus always housed in this shared orifice 4.

Figure 5:
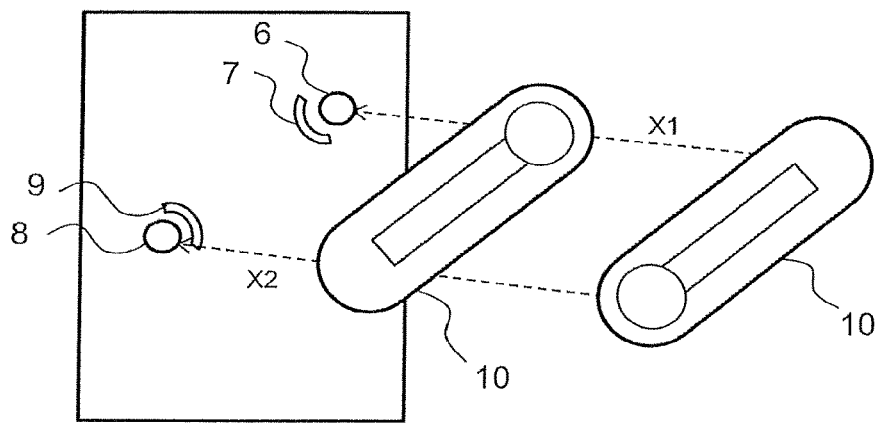

In the embodiment of FIGS. 1 and 5, the first holding orifice in fact corresponds to the second manoeuvring recess 8, which therefore receives the holding shaft 13 in the first direction of insertion. Reciprocally, the second holding orifice corresponds to the first manoeuvring recess 6, which therefore receives the holding shaft 13 in the second direction of insertion. Thus, no additional orifice is required besides the recesses 6, 8, thereby simplifying the solution. FIG. 5 thus shows the front face of the switch 5 with the control device 10 in one direction of insertion or the other.

Moreover, the control device 10 may also advantageously include a telescopic extension on which the holding shaft 13 is positioned. This option thus enables the operator to adjust the length of the centre distance between the main shaft 11 and the holding shaft 13, and therefore to facilitate the use and the adjustment of the control device 10 in cases where the holding orifices are situated at different distances, in particular in the case where the shared orifice 4 of FIGS. 4a and 4b is not situated at an equal distance from the two recesses 6, 8.

Figure 3:
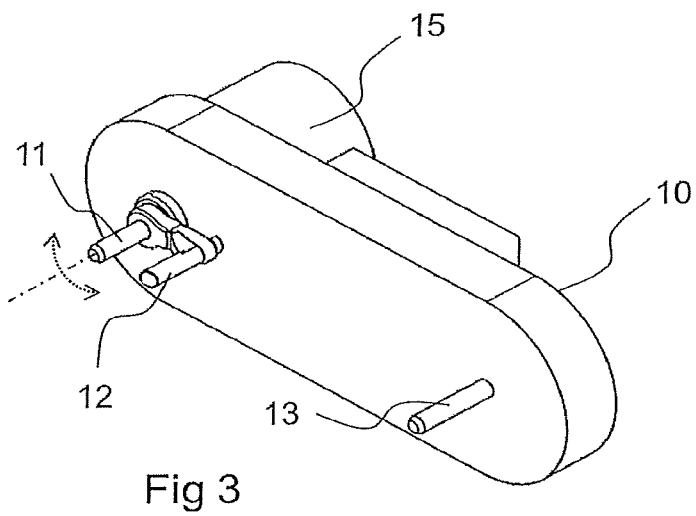
FIG. 3 shows the control device in more detail.

There are various solutions for generating a rotation of the contacts of the switch 5 along the axes X1 or X2 from a rotation of the main shaft 11. In the solution indicated in FIGS. 1, 3 and 5, the control device 10 includes an actuating finger 12 that is mechanically linked to and offset slightly with respect to the main shaft 11, such that it rotates at the same time as the main shaft 11 when the latter is actuated by the motor 15. The two manoeuvring recesses 6, respectively 8, additionally each include an oblong aperture 7, respectively 9, which is also offset slightly with respect to the corresponding recess so as to be able to receive the finger 12 when the main shaft 11 is inserted into the manoeuvring recess 6, respectively 8. The shape of the oblong apertures 7, 9 corresponds to the corresponding rotational travel of the finger 12. The presence of this finger 12 thus creates a lever arm that gives more force for performing a rotation of the mobile contacts along the axis X1, respectively X2.

Instead of the finger 12, it is possible to contemplate other solutions, such as one or more lugs positioned on the main shaft 11 and interacting with complementary systems at the recesses 6, 8. It is also possible to contemplate that the main shaft 11 has a transverse cross section that is not circular but polygonal, for example a hexagonal cross section, and that the manoeuvring recesses 6, 8 have a complementary polygonal cross section, which would be sufficient for a rotation of the main shaft 11 to be able to be translated correctly into a movement of the contacts, without the need for the oblong apertures 7 and 9.

The control device 10 preferably does not include particular blocking means for holding it against the front face of the switch 5, thereby simplifying the implementation thereof. This blocking function is achieved naturally by the fact that the holding shaft 13 is offset slightly with respect to the main shaft 11, either in terms of orientation (that is to say that the two shafts 11 and 13 are not strictly parallel with one another) or in terms of distance (that is to say that their centre distance is slightly different from the centre distance between the recesses 6, 8 and the corresponding holding orifices). Thus, when an operator inserts the control device 10 into the manoeuvring recesses 6, 8 in either one of the two directions of insertion, this offset or lack of parallelism exerts a resistive force that is sufficient to hold the control device 10 in position once it has been inserted.

Figure 6:
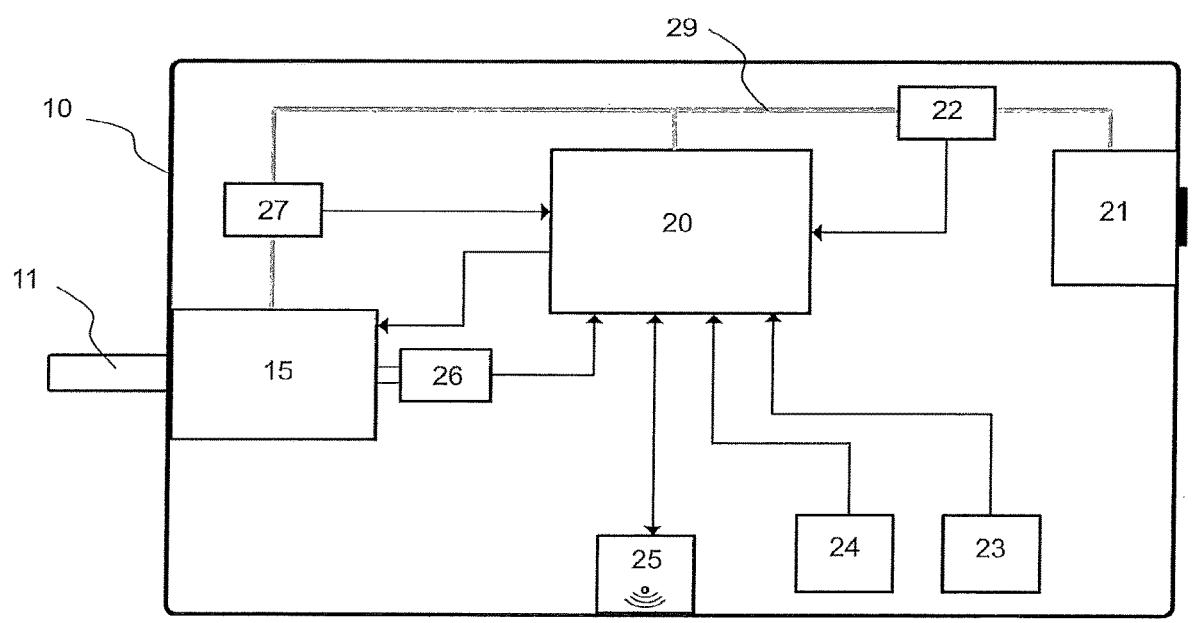
FIG. 6 gives the general structure of the functional elements of the control device.

FIG. 6 gives a schematic depiction of the various functional elements of the control device 10. First and foremost, the control device 10 has a microcontroller 20 that, on the basis of a certain number of items of information that are detailed below, is responsible for managing the control device 10 and for controlling the motor 15 so as to actuate the main shaft 11.

For the sake of clarity, FIG. 6 does not show the optional reduction gear that enables the motor 15 to be coupled to the main shaft 11. FIG. 6 likewise does not show the control relay of the motor that is controlled by the microcontroller 20.

The control device 10 includes a communication interface 25 linked to the microcontroller 20 and making it possible to communicate with an external control console 3. The communication interface 25 preferably makes it possible to communicate through a network of wireless type, such as Bluetooth LE (Low Energy) or others. The external console 3 may be a smartphone, a tablet, a laptop computer, a remote control or any other equivalent device. It is used by an operator to control and dialogue remotely with the control device 10: said operator is thus able to send instructions and receive statuses or reports from the control device 10 without being obliged to remain in front of the switch 5 at all times.

The external console 3 may optionally also be used to identify the switch that the operator wishes to control. To this end, it includes identification means that enable an operator to read an identifier positioned on the switch so as to automatically recover the useful information regarding the type of switch, its contacts actuation mechanism, etc. This identifier is for example a OR code positioned on the front face of the switch 5, and the identification means comprise a reader capable of scanning this OR code. The external console 3 may likewise determine the initial position of the contacts of the switch 5 by displaying its front face. In a basic version of the invention, this identification of the type of switch and of its initial position could also be performed by the operator directly by dialoguing with the external console 3.

The control device 10 includes a power supply 21 that supplies the electric power 29 necessary for the microcontroller 20 to operate and for the motor 15 to operate. This power supply may be for example a rechargeable battery 21 embedded into the control device 10, but it is also possible to contemplate the control device 10 being powered by an external power supply connected via a power cord. The control device 10 preferably also includes a detector 22 for detecting a supply undervoltage from the battery 21 or from the external power supply. This undervoltage detector 22 measures the supply voltage of the control device 10 and sends the information to the microcontroller 20, which is then able to calculate whether this measured voltage is below a predetermined threshold. This predetermined threshold corresponds for example to the minimum power required for the motor to correctly drive the mechanism of the switch 5. Using this information, the microcontroller 20 is therefore able to decide to prohibit the startup of the motor 15 if it judges that the motor may not receive enough power 29 to achieve a full movement. The microcontroller 20 then signals an error message on the external console 3 via the communication interface 25.

According to the invention, the control device 10 includes a detector 24 of the direction of insertion of the control device 10 into the switch 5. This detector 24 is linked to the microcontroller 20 and provides it with the information necessary to determine whether the main shaft 11 of the control device 10 is positioned so as to be inserted into the first manoeuvring recess 6 or into the second manoeuvring recess 8 of the switch 5. Thus, in a safe manner and without requiring confirmation from the operator, the control device 10 knows its own orientation and automatically knows which operation will be performed (either opening/closing of the contacts or grounding of the contacts) when an order to operate is sent to the motor 15, thereby advantageously making it possible to be able to successively use the same control device 10 for both operations.

According to one preferred embodiment, the detector of the direction of insertion 24 is formed by an inertial measurement unit (IMU), which usually includes three gyroscopes and three accelerometers. According to another embodiment, the detector 24 could just comprise three accelerometers, which would be enough to know the spatial orientation of the control device 10 in the three directions x,y,z with respect to the reference frame of the switch.

In addition to the detector 24, the control device 10 may optionally include a position detector 23, for example of microswitch or proximity detector type. This position detector 23 informs the microcontroller 20 that the main shaft 11 of the control device 10 has been inserted completely into one of the recesses 6, 8 of the switch and therefore that the control device 10 is held correctly against the switch. In the case where the control device 10 does not include other locking means for holding it against the switch, it is specifically preferable to verify this condition before initiating movement of the motor 15.

According to one embodiment, the control device 10 includes a sensor 26 for sensing the angular position of the main shaft 11 and of the finger 12. This angular position sensor 26, which is for example a potentiometer, makes it possible in particular to inform the microcontroller 20 that the movement required of the motor 15 has ended, so as to stop the motor 15. It also enables the microcontroller 20 to verify that the main shaft 11 of the motor 15 is located in an appropriate initial position before starting an operation and, if this is not the case, to control a slight rotation of the motor 15 to put it in this correct initial position.

The control device 10 also includes an overload detector 27 that measures the current consumed by the motor 15 and that enables the microcontroller 20 to detect a possible overload of the current flowing through the motor 15, caused for example by a blockage, a mechanical complication or idle rotation. The microcontroller 20 is then able to stop the movement and signal an error message on the external console 3.

The invention also relates to a method enabling an operator to perform, from an external console 3, the opening/closing and grounding operations using the control device 10.

In a first preliminary step, the operator uses the external console 3 to scan an identifier (OR code) positioned on the switch 5, so as to automatically identify the type of switch on which he wishes to act. The console 3 may moreover include viewing means such that the operator asks the console to detect either the position of the contacts directly or the position of an indicator of the state of the mechanism or of the position of the contacts of the switch 5 so as to correctly position the main shaft 11 and the finger 12 before insertion. This first step is not mandatory and, as indicated above, may also be carried out manually or by dialogue between the operator and the console 3 if for example the switch does not have a visible identifier.

In a second step, the operator positions the control device 10 in front of the switch 5. The detector 24 of the control device 10 then detects the direction of insertion chosen by the operator, thereby making it possible to know whether the main shaft 11 will be inserted into the first manoeuvring recess 6 in order to perform an operation of opening/closing the contacts or into the second manoeuvring recess 8 in order to perform an operation of grounding the contacts. On the basis of the detection of the first or of the second direction of insertion, the microcontroller 20 is capable of prepositioning the finger 12 in the correct initial position (also by virtue of the information originating from the angular position sensor 26) and of informing the operator, via the external console 3, of the correct positioning of the control device 10 and of the operation that will be able to be performed. Any error on the part of the operator is thus prevented, as said operator is guided in the use of the control device 10 and the performance of the various steps.

In a third step, the operator inserts the control device 10 into the chosen recess, for example into the first recess 6. If there is a position detector 23, then the microcontroller 20 automatically detects the correct insertion of the control device 10. Otherwise, the operator himself verifies that the control device 10 is positioned correctly.

In a fourth step, the operator will be able to control an operation on the contacts of the switch 5 by virtue of the external console 3. To this end, he is able beforehand to move away from the switch 5, for example into an adjacent room, in order to avoid any dangerous manoeuvres while remaining in front of the switch. Next, he sends a movement order that is possibly timed via the external console 3, for example to open the contacts. The microcontroller 20 receives this order, verifies firstly that it complies with the current direction of insertion of the control device 10, and then performs and monitors the movement by virtue in particular of the current sensor 27 (to verify that the motor does not have any electrical defect) and of the position detector 23 (to verify that the movement has indeed finished).

In a fifth step, once the operator has verified on the external console 3 that the movement for opening the contacts has finished, he may return to in front of the switch 5 in order to remove the control device 10 from the first recess 6 and to reposition it in the other direction of insertion, facing the second recess 8, in order to be able to perform another operation, such as for example a grounding of the contacts. A return is then made to the second step.

According to one variant embodiment and in the case where the switch 5 includes a manual trip button, in particular in the case of a circuit breaker, the control device 10 may also include a dedicated actuation module capable of actuating such a trip button. This actuation module has to be positioned by the operator facing the button to be tripped, is electrically powered by the control device 10 and is controlled by the microcontroller 20, via the external console 3.

The invention claimed is:

1. A portable control device designed to control contacts of an electrical switch, the control device comprising a main drive shaft, a holding shaft, a motor for driving the main shaft and a microcontroller for controlling the motor, wherein the control device is designed such that:
   in a first direction of insertion, the main shaft is able to be inserted into a first manoeuvring recess of the switch in order to perform a movement for opening/closing the contacts of the switch, the holding shaft then being housed in a first holding orifice,
   in a second direction of insertion, the main shaft is able to be inserted into a second manoeuvring recess of the switch in order to be able to perform a movement for grounding the contacts of the switch, the holding shaft then being housed in a second holding orifice,
   wherein the control device includes a detector of the direction of insertion of the control device into the switch, the detector of the direction of insertion being linked to the microcontroller.

2. The control device according to claim 1, wherein the first holding orifice and the second holding orifice are combined into a single shared orifice.

3. The control device according to claim 1, wherein the first holding orifice corresponds to the second manoeuvring recess and the second holding orifice corresponds to the first manoeuvring recess.

4. The control device according to claim 1, wherein the detector of the direction of insertion includes an inertial measurement unit.

5. The control device according to claim 1, further comprising a position detector for verifying that the main shaft has been inserted into one of the first and second manoeuvring recesses of the switch.

6. The control device according to claim 1, further comprising an angular position sensor for determining the angular position of the main shaft.

7. The control device according to claim 1, further comprising a detector for detecting an overload of the electric current flowing through the motor.

8. The control device according to claim 1, further comprising a supply undervoltage detector, linked to the microcontroller, so as to prohibit movement of the motor if the supply voltage is below a predetermined threshold.

9. The control device according to claim 1, wherein the main shaft and the holding shaft are not strictly parallel with one another.

10. The control device according to claim 1, further comprising an actuating finger that is offset with respect to a main axis and mechanically linked to the main axis.

11. The control device according to claim 1, further comprising a telescopic extension on which the holding shaft is mounted.

12. A system for controlling contacts of an electrical switch, the system comprising a control device according to claim 1, and comprising a portable external console linked to the control device through a wireless link, the external console including means for identifying the switch.

13. The control system according to claim 12, wherein the identification means include a QR code reader.

* * * * *